(12) United States Patent
Shih et al.

(10) Patent No.: US 6,868,522 B2
(45) Date of Patent: Mar. 15, 2005

(54) METHOD FOR TESTING A COMMUNICATION MODULE AND THE ASSOCIATED RECORDING MEDIUM

(75) Inventors: Chien-Yi Shih, Taipei Hsien (TW); Yi-Ching Chen, Taipei Hsien (TW); Da-Jin Hsu, Taipei Hsien (TW)

(73) Assignee: VIA Technologies Inc., Hsin-Tien (TW)

( * ) Notice: Subject to any disclaimer, the term of this patent is extended or adjusted under 35 U.S.C. 154(b) by 490 days.

(21) Appl. No.: 09/683,081

(22) Filed: Nov. 15, 2001

(65) Prior Publication Data

US 2002/0144207 A1 Oct. 3, 2002

(30) Foreign Application Priority Data

Mar. 29, 2001 (TW) ...................................... 090107559 A

(51) Int. Cl.⁷ .......................... G06F 11/00; H03M 13/00
(52) U.S. Cl. ...................................... 714/800; 714/746
(58) Field of Search .......................... 714/746, 800–805, 714/807, 814, 824, 787–788, 761–762, 752, 811

(56) References Cited

U.S. PATENT DOCUMENTS 5,052,026 A * 9/1991 Walley ....................... 375/373

6,543,022 B1 * 4/2003 O'Connor ................... 714/752

OTHER PUBLICATIONS

Dr. Bernd X. Weis, Cell alignment in ATM systems via header error check: performance evaluation had hardware considerations, Mar. 1990, IEEE, pp. 115–130.*

* cited by examiner

*Primary Examiner*—Shelly A Chase
(74) *Attorney, Agent, or Firm*—Winston Hu

(57) ABSTRACT

A communication module coding a first original header signal as a first check signal by a first coding means, and outputs an output header signal by whitening the first original header signal and the first check signal with a clock code according to a second coding means. A method for the communication module includes obtaining the output header signal; generating a guessing clock code; dewhitening the output header signal into a second original header signal and a second check signal by a third decoding means with the guessing clock code; utilizing the first coding means to form a third check signal from the second original header signal; and comparing the third check signal to the second check signal. The third decoding means decodes the output header signal into the first original header signal and the first check signal while the guessing clock code is substantially the same as the clock code.

18 Claims, 3 Drawing Sheets

METHOD FOR TESTING A COMMUNICATION MODULE AND THE ASSOCIATED RECORDING MEDIUM

BACKGROUND OF INVENTION

1. Field of the Invention

The present invention relates to a verification method for checking a communication module. More specifically, the present invention discloses a verification method that is able to retrieve an original data according to a data packet.

2. Description of the Prior Art

In the information era, communication for various digital information is already a part of daily life. Under this tendency, all mobile phones, personal digital assistants (PDA), computers and information apparatuses (IA), emphasize the ability of digital information communications. Therefore, the research and development of communication modules becomes an important part of the information industry.

When developing the communication module, it is a necessary step to check and debug the communication module for ensuring the communication module is capable of operating. One test method is to connect the output of the communication module to a logic analyzer, in order to analyze whether the digital signal which is transmitted from the communication module is correct or not, so as to achieve the purpose of verification.

In general, transmitted digital communication signals are formatted to comply with a strict communication protocol, in order to achieve information exchange. The Bluetooth signal transmission system, put forth by the information industry circle and academic circles, defines a format to form packets for data transmission . Please refer to FIG. 1. FIG. 1 is a diagram of a transmitter and a receiver during signal transmission using Bluetooth communication technology. The transmitting end 10 comprises a communication module 20 and a radio frequency interface 30. The transmitting end 10 is able to signal the receiving end 50 over a channel 40. The receiving end comprises another radio frequency interface 55 and a receiving module 57, for processing the received signal. In the transmitting end 10, the transmitted data is formed into an information packet 32 by the communication module 20, then the information packet 32 is radiated by the radio frequency interface 30. The communication signal can be transmitted to the receiving end 50 using the channel 40 (for example, wireless communication or infrared ray transmission). When the receiving end 50 receives the communication signal, it converts the communication signal back to the information packet 32 by utilizing the internal radio frequency interface 55. Then, the receiving module 57 in the receiving end 57 obtains the data portion of the information packet 32.

Regarding processes for formation of the information packet by the communication module 20 in the transmitting end, and handling by the receiving module 57 in the receiving end, further description is as follows. As the transmitting end 10 transmits data, the data corresponds to the original data signal 12 in the communication module 20. Further, the communication module 20 also generates a clock code 16 and a first original header signal 18. The first original header signal 18 is capable of forming a first check signal 18b by using a first coding method. A first header signal 22 can be formed by combining the first original header signal 18 and the first check signal 18b. The first header signal 22 is encoded as an output header signal 24 by using the clock code 16 according to the second coding method. Further, the original data signal 12, corresponding to the data, is encoded as the second data signal 28 by use of the clock code 16 according to a data coding method 35. At last, the output header signal 24 combines with the second data signal 28 to form the data packet 32. Please note that, in the process of forming the output header signal 24 by using the second coding method 45, and forming the second data signal 14 by use of the data coding method 35, the clock code 16 is required. In other words, the output header signal 24 and the second data signal 28, which are in the information packet 32, both relate to the clock code 16. Even if using the same first header signal 22, but a different clock code, then the output header signal formed by the second coding method 45 is different. Also, if using the same original data signal 12, but a different clock code 16, then the second data signal 28 formed by the data coding method 35 is not the same.

For the sake of retrieving the data in the information packet 32 correctly, when the transmitting end 10 builds a connection with the receiving end 50, the transmitting end 10 whitens the clock code 16 with a fixed form, then transmits to the receiving end. If the receiving module 57 in the receiving end 50 is able to retrieve the clock code 16, then it acknowledges the transmitting end 10. Following, when the receiving module 57 receives the packet 32 demodulated by the radio frequency interface 55, the receiving module 57 is able to decode the second data signal 28 of the data packet 32 into the original data signal 12 by using the second data decoding method 25 and the clock code 16 of the receiving module 57. Therefore, the receiving end 50 can obtain the data from the original data signal 12 and achieve the purpose of transmission. Further, the output header signal 24 of the information packet 32 can be decoded into the first header signal 22 by using the third decoding method 67 and the clock code 16. As mentioned before, in the process of forming the output header signal 24 from the first header signal 22, and forming a second data signal 28 from the original data signal 12, the clock code 16 is required. Of course, in the process of decoding the output header signal 24 into the first header signal 22, and decoding the second data signal 28 into the original data signal 12, the same clock code 16 is also required, so as to obtain the correct result after decoding.

Conventionally, when testing the communication module 20, the logic analyzer must be used to analyze the data packet 32 which is transmitted from the communication module 20, then the data in the data packet 32 must be checked for whether it is the same as the data of the original data signal 12 or not, so as to verify the communication module 20. As mentioned before, to decode the original data signal 12 from the information packet 32, the correct clock code 16 must be used. However, the communication module 20 transmits the clock code 16 to the receiving end 50 only in the early stage of the connection. established. In the following stages of the communication, the clock code is not transmitted. For completely verifying, several hours are required to do checking for the communication module. Although only checking data communication for several minutes, thousands of megabits of digital data are transmitted and the associated verification is very difficult. In addition providing signal pins to obtain the clock code 16 of the communication module 20, the hardware design of the communication module 20 must be changed and additional pins are required.

SUMMARY OF INVENTION

It is therefore a primary objective of this present invention to provide a method, which is able to intercept a data packet that is transmitted from a communication module, and determine a correct clock code from the data packet, in order to decode data of the data packet, verifying a functionality of the communication module.

The present invention, briefly summarized discloses a method for testing a communication module. The communication module is capable of coding a first original header signal as a first check signal by a first coding means, and outputting an output header signal by whitening the first original header signal and the first check signal with a clock code according to a second coding means. The method includes the following steps: obtaining the output header signal; generating a guessing clock code; dewhitening the output header signal into a second original header signal and a second check signal by a third decoding means with the guessing clock code; utilizing the first coding means to form a third cheek signal from the second original header signal; and comparing the third check signal to the second check signal. The third decoding means is capable of decoding the output header signal into the first original header signal and the first check signal while the guessing clock code is substantially the same as the clock code.

It is an advantage of the present invention that the method uses a test method to obtain the correct clock code directly from the data packet, and verify the data in the data packet. Therefore, the present invention is able to execute the checking quickly, substantially and at a low cost. The checking process is improved, and quality of the communication module is ensured. The present invention is achieved by using the checking program of a recording medium, and not used with other hardware devices.

These and other objectives of the present invention will become obvious to those of ordinary skill in the art after reading the following detailed description of the preferred embodiment which is illustrated in the drawings.

DETAILED DESCRIPTION

The present invention is able to intercept an information packet and retrieve a correct clock code thereof so as to improve testing.

Figure 1:
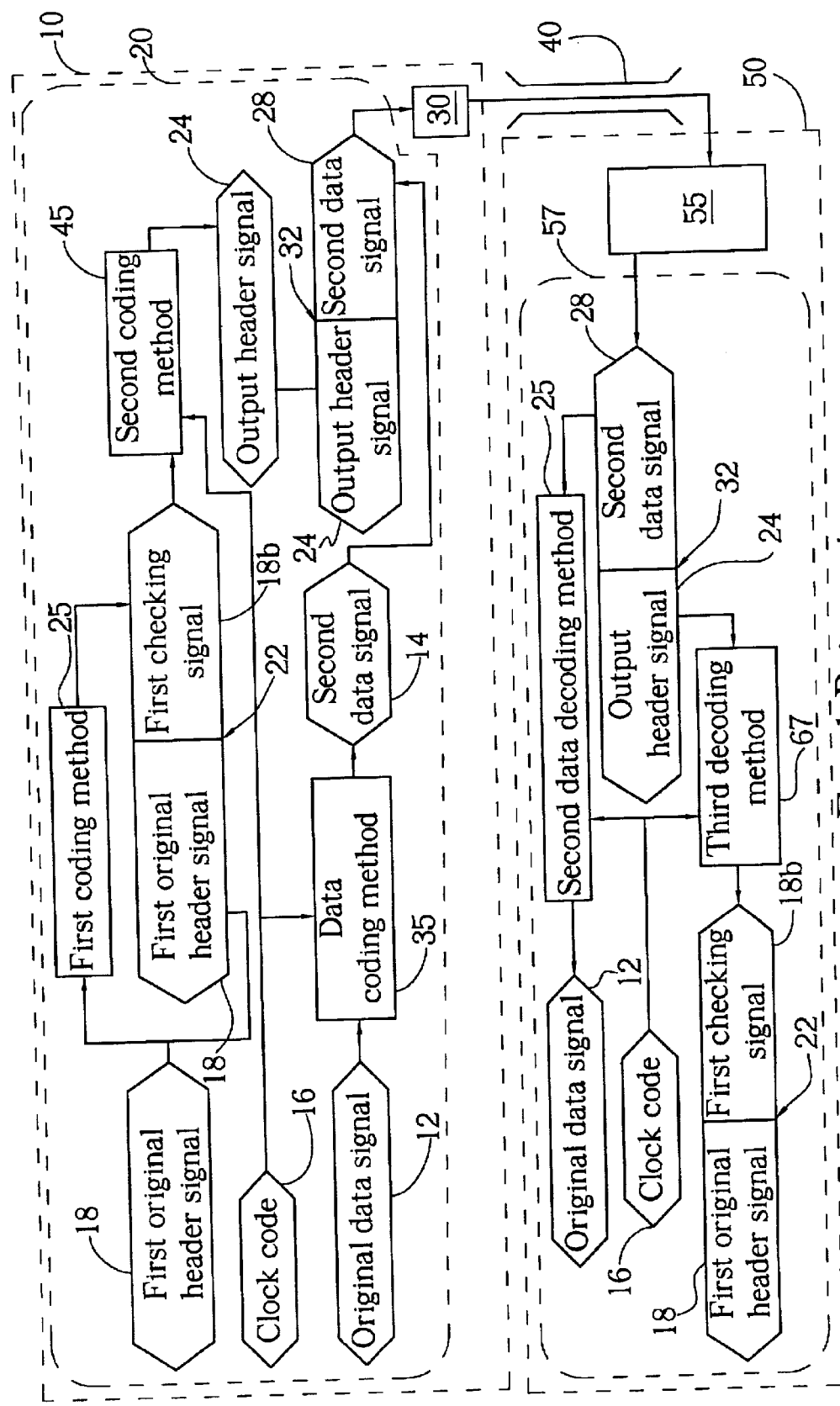
FIG. 1 is a function block diagram of a transmitter and a receiver of a communication system.
Figure 2:
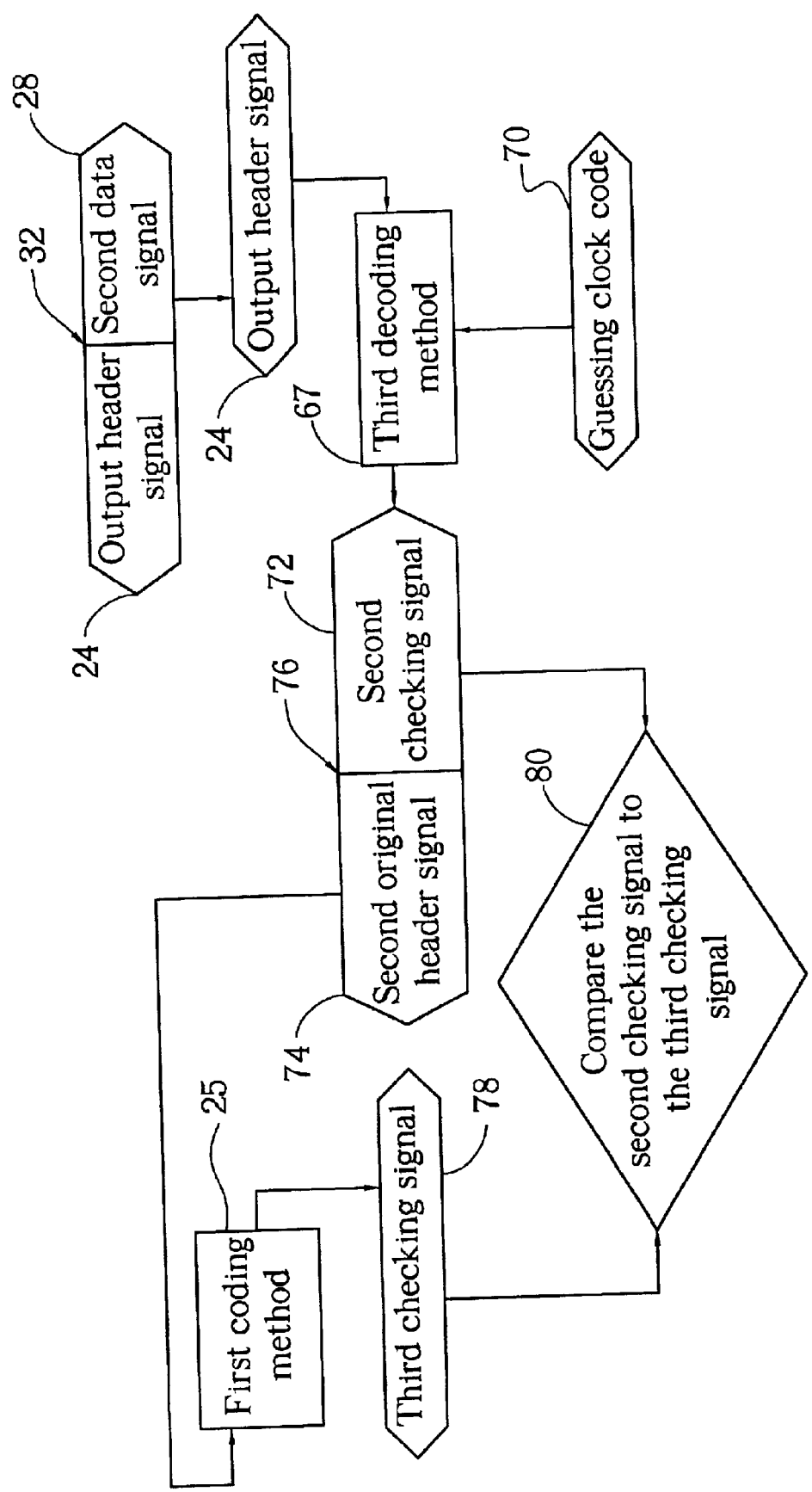
FIG. 2 is a diagram illustrating a test method of the present invention.

Please refer to FIG. 2. FIG. 2 is a diagram of a test method of the present invention. In the test method of the present invention, the correct clock code can be obtained by using only the information packet 32 thereof, without additional channel. The test method of the present invention is to receive the information packet 32 first, and obtain an original output header signal 24 directly from the information packet 32. After getting the information packet 32, the output header signal 24 may be decoded into a second header signal 76 with a guessing clock code 70 and a third decoding method 67. Please note that, the third decoding method 67 is substantially the same as the third decoding method which is used in the receiving module 57 in FIG. 1 (or any of the equivalent method that is able to decode the output header signal 24 into the first original header signal 18 and the first check signal 18b utilizing the correct clock code ). If the guessing clock code happens to be the correct clock code, then the output header signal 24 can be correctly decoded into the first header signal 22 by using the third decoding method 67. But, at the beginning of the test method of the present invention, the correct clock code 16 is unknown, and therefore, the signal which is decoded from the output header signal 24 by utilizing the guessing clock code 70 is a second original header signal 76.

After obtaining the second header signal 76, the second original header signal 74 and the second check signal 72 can be obtained directly from the second header signal 76. The second original header signal 74 is then whitened into a third check signal 78 according to the first coding method 25. In the decision box 80, the third check signal 78 is compared to the second check signal 72, to determine whether the guessing clock code 70 is the correct clock code 16 or not. Please note that the communication module in FIG. 1, in which the first coding method 25 can form the first check signal 18b from the first original header signal 18, and the first coding method 25 have no relationship with the clock code during execution. The first header signal 22 is obtained by combining the first original header signal 18 with the first check signal 18b. Therefore, the first original header signal 18 becomes the front part of the first header signal 22, and the first coding method 25 is utilized to generate the first check signal 18b as the hind part of the first header signal 22. In the test method of the present invention, the third check signal 78 is also generated by the second original header signal 74 of the second header signal 76 by utilizing the first coding method 25. If the guessing clock code 70 is effectively the same as the correct clock code 16, then the second header signal 76 dewhitened by the output header signal 24 and the guessing clock code 70 according to the third decoding method 67 are also the same as the first header signal 22. In this case, the third check signal 78 is effectively the same as the second check signal 72. Inversely, if the third check signal 78 is different from the second check signal 72, it implies that the guessing clock code 70 is not the correct clock code 16. Therefore, the second header signal 76 which is decoded by the output header signal 24 and the guessing clock code 70 according to the third decoding method 67 is not correct. So, the second check signal 72 cannot be correctly obtained from the second original header signal 74 according to the first coding method 25.

In summary, the output header signal 24 can be decoded into the first header signal 22 by using the correct clock code 16 according to the third decoding method 67. There is a relationship between the first original header signal 18, which is the front part of the first header signal 22, and the first check signal 18b, which is the hind part of the first header signal 22. The first original header signal is able to generate the first check signal 18b by utilizing the first coding method 25. In the test method of the present invention, it is using the same relationship to check the second header signal 76. If the front part of the second header signal 76 is unable to obtain the correct hind part according to the first coding method 25, then the output header signal 24 cannot be correctly decoded by the third decoding method 67, and the guessing clock code 70 which is used in the decoding process is not the correct clock code 16. Inversely, if the third check signal 78 and the second check signal 72 are effectively the same, it indicates that the guessing clock code 70 is the correct clock code 16. Then, the output header signal 24 can be decoded into the correct first header signal 22 by utilizing the guessing clock code 70 and the third decoding method.

As described above, the test method of the present invention at first randomly generates a guessing clock code 70 and then determine whether the guessing clock code 70 is the correct clock code 16 or not, wherein the mentioned correct clock code is the clock code 16 that is originally used to whiten the original data signal 12. If the guessing clock code 70 is not a correct clock code 16, then the guessing clock code 70 is changed to another guessing value, and the verify process is repeated until the correct clock code 16 is found out. Once the correct clock code 16 is found, the test method of the present invention is able to decode the second data signal 28 of the data packet 32 into the original data signal 12 by utilizing the second data decoding method 65 (see FIG. 1) and the correct clock code 16. The data in the original data signal 12 is checked to verify the functionality of the communication module.

Figure 3:
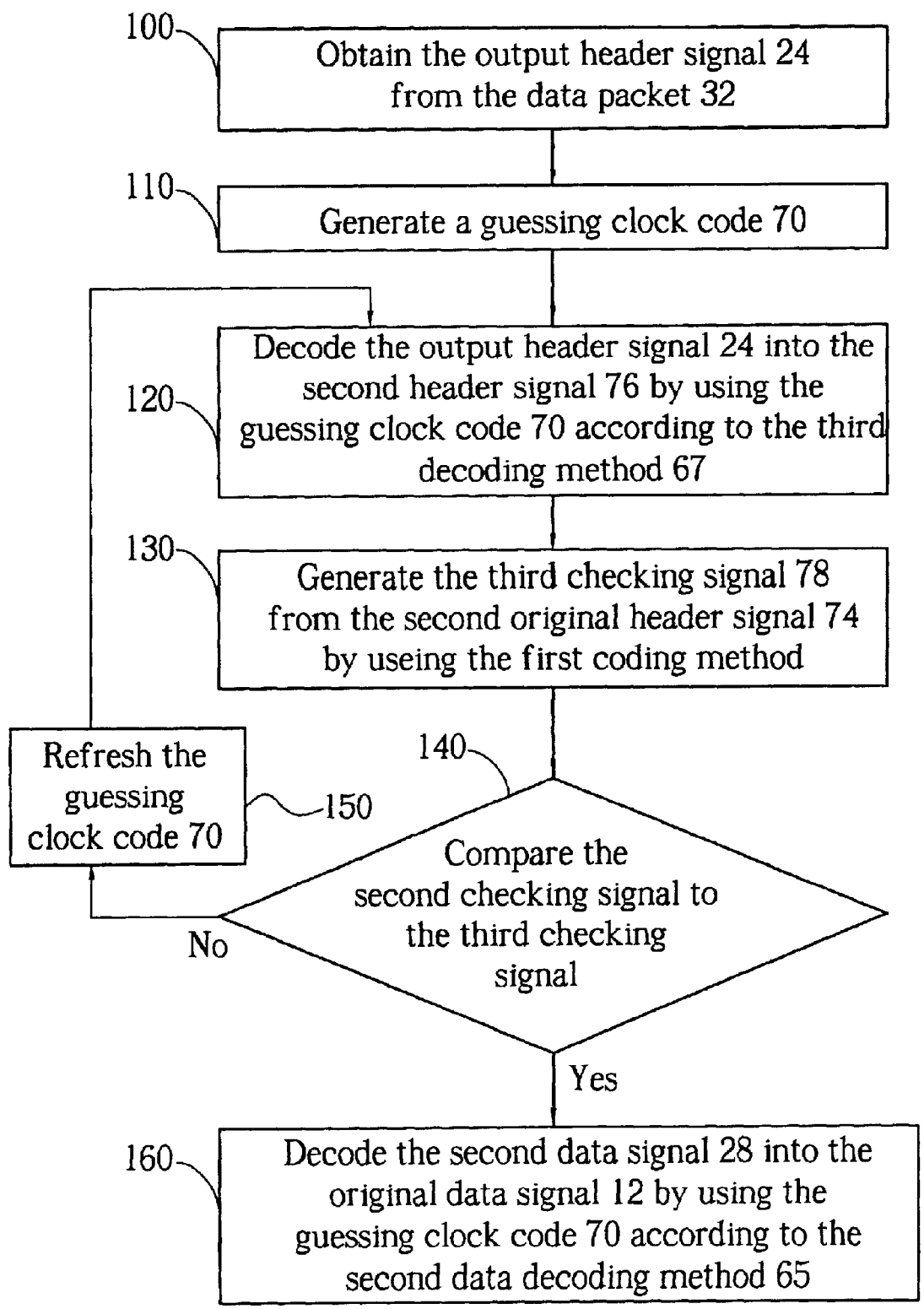
FIG. 3 is a flow chart of the test method of the present invention.

Please refer to FIG. 3. FIG. 3 is a flow chart of the test method of the present invention. It comprises the following steps:

At step 100, receive a data packet 32 and obtain the output header signal 24 therefrom.

Step 110: Generating a guessing clock code 70.

Step 120: Decoding the output header signal 24 into the second header signal 70, according to the guessing clock code 70 and the third decoding method 67.

Step 130: Forming the third check signal 78 from the second original header signal 74 of the second header signal 76, according to the first coding method.

Step 140: Comparing the second check signal 72 of the second header signal 76 with the third check signal 78. If they are effectively the same, then go to step 160; otherwise, go to step 150.

Step 150: Refreshing the guessing clock code 70, and repeating from step 120.

Step 160: Decoding the second data signal 28 into the original data signal 12 by utilizing the guessing clock code 70 and the second data decoding method 65.

It should be noted that, in the typical Bluetooth technology, the clock code 16 is six-bit long, and the communication module is a master-slave structure. Therefore, there are 64 different clock codes totally. However, the transmitting end and the receiving end each occupies half of the 64 possible clock codes. Thus, the test method can obtain the correct clock code 16 by refreshing the guessing clock code under 32 times ($2^6/2$). So, the test method of the present invention obtains the correct clock code 16 more quickly and effectively.

In the prior art, it is necessary to record the clock code from the beginning to the end, or to obtain the clock code from the communication module by modifying the hardware design. Contrastingly, the test method of the present invention can retrieve the correct clock code directly from the data packet, and verify the data in the data packet accordingly. Therefore, the present invention is able to execute the checking effectively with low cost. It is very helpful to the test process of the communication module. The present invention can be achieved by using a test program, which may be recorded on a recording medium, according to the execution flow disclosed in FIG. 3 without any additionally auxiliary hardware.

Those skilled in the art will readily observe that various modifications may be made in view of the teachings of the invention. Accordingly, the scope of this invention should be limited only in view of the appended claims.

What is claimed is:

1. A method for testing a communication module, the communication module capable of coding a first original header signal as a first check signal by a first coding means, and outputting an output header signal by whitening the first original header signal and the first check signal with a clock code according to a second coding means, the method comprising:

obtaining the output header signal;

generating a guessing clock code;

dewhitening the output header signal into a second original header signal and a second check signal by a third decoding means with the guessing clock code;

utilizing the first coding means to form a third check signal from the second original header signal; and comparing the third check signal to the second check signal;

wherein the third decoding means is capable of decoding the output header signal into the first original header signal and the first check signal while the guessing clock code is substantially the same as the clock code.

2. The method of claim 1 wherein the communication module utilises a data coding means and the clock code for coding an original data signal into a second data signal, and outputs the second data signal.

3. The method of claim 2 further comprising:

obtaining the second data signal; and utilizing a second data decoding means and the guessing clock code to decode the second data signal into a third data signal if the third check signal is substantially the same as the second check signal;

wherein the second data decoding means is able to decode the second data signal into the original data signal while the guessing clock code is substantially the same as the clock code.

4. The method of claim 3 further comprising testing the functionality of the communication module by comparing the original data signal to the second data signal.

5. The method of claim 2 wherein the communication module is designed to process the first original header signal and the original data signal according to a Bluetooth communication protocol standard.

6. The method of claim 1 further comprising repeating the following steps until the third check signal is substantially the same as the second check signal:

refreshing a content of the guessing clock code;

decoding the output header signal according to the refreshed guessing clock code and the third decoding means;

refreshing the second original header signal and the second check signal according to the decoded output header signal;

refreshing the third check signal from the refreshed second original header signal by utilizing the first coding means; and comparing the refreshed third check signal with the refreshed second check signal.

7. The method of claim 6 wherein the clock code is a signal with a fixed bit length.

8. The method of claim 7 wherein a number of times of refreshing the content of the guessing clock code is not larger than half the bit size of the content of the guessing clock code so that the second check signal and the third check signal are substantially the same.

9. The method of claim 7 wherein the clock code is a six-bit signal.

10. A recording medium for storing a test program capable of being executed on a computer for testing a communication module, the communication module generating a first check signal from a first original header signal according to a first coding means, and generating an output header signal according to a second coding means that utilizes the first original header signal, the first check signal, and a clock code, the test program comprising:

obtaining the output header signal;

generating a guessing clock code;

decoding the output header signal into a second original header signal and a second check signal according to a third decoding means and the guessing clock code;

forming a third check signal from the second original header signal according to the first coding means; and comparing the third check signal with the second check signal;

wherein the third decoding signal is capable of decoding the output header signal into the first original header signal and the first check signal according to the clock code.

11. The recording medium of claim 10 wherein the communication module is able to code an original data signal into a second data signal by utilizing a data coding means, and is capable of outputting the second data signal.

12. The recording medium of claim 11 wherein the test program further comprises:

obtaining the second data signal; and if the third check signal and the second check signal are substantially the same, decoding the second data signal into a third data signal according to a second data decoding means that uses the guessing code;

wherein the second data decoding means is able to decode the second data signal into the original data signal according to the clock code.

13. The recording medium of claim 12 wherein the test program further comprises comparing the original data signal with the second data signal to verify functionality of the communication module.

14. The recording medium of claim 11 wherein the communication module is designed to process the first original header signal and the original data signal according to a Bluetooth communication protocol.

15. The recording medium of claim 10 wherein the test program comprises repeating following steps until the third check signal and the second check signal are substantially the same:

refreshing a content of the guessing clock code;

re-decoding the output header signal according to the third decoding means and the refreshed guessing clock code;

refreshing the second original header signal and the second check signal according to the re-decoded output header signal;

refreshing the third check signal from the refreshed second original header signal according to the first coding means; and comparing the refreshed third check signal with the refreshed second check signal.

16. The recording medium of claim 15 wherein the clock code is a signal with a fixed bit length.

17. The recording medium of claim 16 wherein a number of times of refreshing the content of the guessing clock code is not larger than half the bit size of the content of the guessing clock code so that the third check signal and the second check signal are substantially the same.

18. The recording medium of claim 16 wherein the clock code is a six-bit signal.

\* \* \* \* \*